(12) United States Patent
Kim et al.

(10) Patent No.: US 10,347,913 B2
(45) Date of Patent: Jul. 9, 2019

(54) METHOD FOR PREPARING CORE-SHELL STRUCTURED PARTICLE BY USING CONTINUOUS COUETTE-TAYLOR CRYSTALLIZER

(71) Applicants: LG Chem, Ltd., Seoul (KR); University-Industry Cooperation Group of Kyung Hee University, Yongin-si (KR)

(72) Inventors: Woo Sik Kim, Seoul (KR); Khuong Dien Thai, Yongin-Si (KR); Byung Chun Park, Daejeon (KR); Seong Hoon Kang, Daejeon (KR); Wang Mo Jung, Daejeon (KR); Hong Kyu Park, Daejeon (KR)

(73) Assignees: LG Chem, Ltd. (KR); University-Industry Cooperation Group of Kyung Hee University (KR)

( * ) Notice: Subject to any disclaimer, the term of this patent is extended or adjusted under 35 U.S.C. 154(b) by 199 days.

(21) Appl. No.: 14/422,079

(22) PCT Filed: Oct. 23, 2014

(86) PCT No.: PCT/KR2014/010034
§ 371 (c)(1),
(2) Date: Feb. 17, 2015

(87) PCT Pub. No.: WO2016/060310
PCT Pub. Date: Apr. 21, 2016

(65) Prior Publication Data
US 2016/0104879 A1    Apr. 14, 2016

(30) Foreign Application Priority Data
Oct. 14, 2014 (KR) .................. 10-2014-0138172

(51) Int. Cl.
*H01M 4/36* (2006.01)
*B01J 19/28* (2006.01)
(Continued)

(52) U.S. Cl.
CPC .......... *H01M 4/525* (2013.01); *C01G 53/006* (2013.01); *H01M 4/366* (2013.01); *H01M 4/505* (2013.01);
(Continued)

(58) Field of Classification Search
CPC .... H01M 4/0492; H01M 4/0497; H01M 4/36; H01M 4/48; H01M 4/525; H01M 4/505;
(Continued)

(56) References Cited

U.S. PATENT DOCUMENTS

2014/0065058 A1* 3/2014 Park .................. H01M 4/485
423/594.3

FOREIGN PATENT DOCUMENTS

KR     20060130964 A    12/2006
KR      101062404 B1     9/2011
(Continued)

OTHER PUBLICATIONS

Khuong Dien Thai et al ,"Fabrication of Multi-layer agglomerates in Taylor Vortex", Oct. 2013.*
(Continued)

*Primary Examiner* — Tabassom Tadayyon Eslami
(74) *Attorney, Agent, or Firm* — Lerner, David, Littenberg, Krumholz & Mentlik, LLP

(57) ABSTRACT

The present invention provides a method for preparing a core-shell structured particle, the method using a continuous Couette-Taylor crystallizer in which a core reactant inlet, a shell reactant inlet, and a product outlet are sequentially formed on an outer cylinder along a flow direction of a fluid flowing in a Couette-Taylor fluid passage between the outer
(Continued)

cylinder and an inner cylinder, wherein a core particle is primarily formed in the fluid passage by a core reactant supplied through the core reactant inlet; a shell layer is formed on a surface of the core particle to cover the core particle by a shell reactant supplied through the shell reactant inlet; and a core-shell structured particle in which the shell layer is formed on the circumference of the core particle, is discharged to the outside through the product outlet.

9 Claims, 3 Drawing Sheets

(51) Int. Cl.
 $H01M\ 4/525$ (2010.01)
 $H01M\ 4/505$ (2010.01)
 $C01G\ 53/00$ (2006.01)

(52) U.S. Cl.
 CPC ...... $C01P\ 2004/03$ (2013.01); $C01P\ 2004/84$ (2013.01)

(58) Field of Classification Search
 CPC ........ H01M 4/049; H01M 4/366; H01M 4/04; H01M 4/58; B01J 19/28; C01G 53/04; B22F 2201/016

USPC .............. 428/32.73, 40.2; 422/209; 427/218
See application file for complete search history.

(56) References Cited

FOREIGN PATENT DOCUMENTS

| KR | 2012-0028576 A | | 3/2012 |
| KR | 101148004 | * | 5/2012 |
| KR | 10-20120028576 | * | 8/2012 |
| KR | 2013-0032563 A | | 4/2013 |
| KR | 20130080565 A | | 7/2013 |
| KR | 20140083854 A | | 7/2014 |
| WO | 2013/042986 | * | 3/2013 |
| WO | WO/2013/042986 | * | 3/2013 |

OTHER PUBLICATIONS

Thai, Khuong Dien et al., "Fabrication of Multi-layer Agglomerates in Taylor Vortex", The Korean Institute of Chemical Engineers, Oct. 23, 2013.

International Search Report from PCT/KR2014/010034, dated Jun. 29, 2015.

* cited by examiner

METHOD FOR PREPARING CORE-SHELL STRUCTURED PARTICLE BY USING CONTINUOUS COUETTE-TAYLOR CRYSTALLIZER

CROSS REFERENCE TO RELATED APPLICATIONS

The present application is a national entry under 35 U.S.C. § 371 of International Application No. PCT/KR2014/010034 filed Oct. 23, 2014, which claims priority to Korean Patent Application No. 10-2014-0138172, filed Oct. 14, 2014, the entire disclosures of which are hereby incorporated by reference herewith.

TECHNICAL FIELD

The present invention relates to a method for preparing a core-shell structured particle, and more particularly, to a method for preparing a core-shell structured particle, in which a core particle is primarily formed in a Couette-Taylor crystallizer, and a shell layer is formed in-line on the core particle in the same crystallizer.

BACKGROUND ART

Since a positive electrode active material of a lithium secondary battery is a very important element that determines performance, durability, and capacity of the battery, there is a trend to show indefatigable zeal in developing technology for reliably mass-producing the positive electrode active material according to the burgeoning demand for the secondary battery.

As one of the trends, there was an attempt to use, as a precursor of the positive electrode active material, a core-shell structured particle formed by stacking a shell layer on a core particle (Korea Patent Publication No. 2013-80565 published on Jul. 15, 2013). Since such a core-shell structured structure is advantageous for use in the positive electrode active material in that the core particle and the shell layer perform functions complementary to each other, the core-shell structure is highly rated.

Examples of major factors, which determine physical properties of a core-shell structured particle, are a composition, a size, a shape of a core particle, and a composition and thickness of a shell layer.

Conventionally, in order to form the foregoing core-shell structured particle, a simple coprecipitation reactor, which induces a rotation flow by using an impeller, has been used. An example of such a coprecipitation reactor is disclosed in Korea Patent No. 1062404 (registered on Aug. 30, 2011). Since the conventional impeller-typed coprecipitation reactor has a reaction space in a very large bulk shape, the conventional impeller-typed coprecipitation reactor has considerable difficulties in precisely controlling the foregoing major factors, and especially, continuously completing the core particle and the shell layer in one coprecipitation reactor. This means that it is to difficult to obtain a core-shell structured particle having a desired component and composition, and it is unsuitable to massively produce the core-shell structured particle through the conventional preparing method.

PRIOR ART DOCUMENT

Patent Document (Patent Document 1) Korea Patent Publication No. 2013-80565 published on Jul. 15, 2013

(Patent Document 2) Korea Patent No. 1062404 registered on Aug. 30, 2011

DISCLOSURE OF THE INVENTION

Technical Problem

Accordingly, the present invention provides a method for preparing a core-shell structured particle, in which a core particle is primarily formed in a Couette-Taylor crystallizer, and a shell layer is formed in-line on the core particle in the same crystallizer, thereby solving conventional limitations.

Technical Solution

According to an aspect of the present invention, there is provided a method for preparing a core-shell structured particle, the method using a continuous Couette-Taylor crystallizer in which a core reactant inlet, a shell reactant inlet, and a product outlet are sequentially formed on an outer cylinder along a flow direction of a fluid flowing in a Couette-Taylor fluid passage between the outer cylinder and an inner cylinder, wherein a core particle is primarily formed in the fluid passage by a core reactant supplied through the core reactant inlet; a shell layer is formed on a surface of the core particle to cover the core particle by a shell reactant supplied through the shell reactant inlet; and a core-shell structured particle in which the shell layer is formed on the surface of the core particle to cover the core particle, is discharged to the outside through the product outlet.

Advantageous Effects

According to the present invention, a core particle and a shell layer are continuously formed in one Couette-Taylor crystallizer, thereby easily promoting massive production. Also, since a fluid passage of the Couette-Taylor crystallizer is narrow and has an active fluid flow compared with the conventional impeller flow type, it is possible to form particles having a uniform size. Furthermore, since the formation of a shell layer is sensitively influenced by a concentration of a shell reactant, a rotational speed of an inner rotation cylinder, an average residence time of the shell reactant, and a pH of the shell reactant, it is possible to simply and massively obtain a core-shell structured particle that is excellent in electrical characteristic and durability though optimization of process conditions.

BRIEF DESCRIPTION OF THE DRAWINGS

The following drawings attached to this specification exemplarily illustrate one preferred embodiment of the present invention, and serve to facilitate understanding of the technical ideas of the present invention with the detailed description, and thus the present invention is not limited to the disclosures in the drawings.

DESCRIPTION OF THE SYMBOLS

Figure 1:
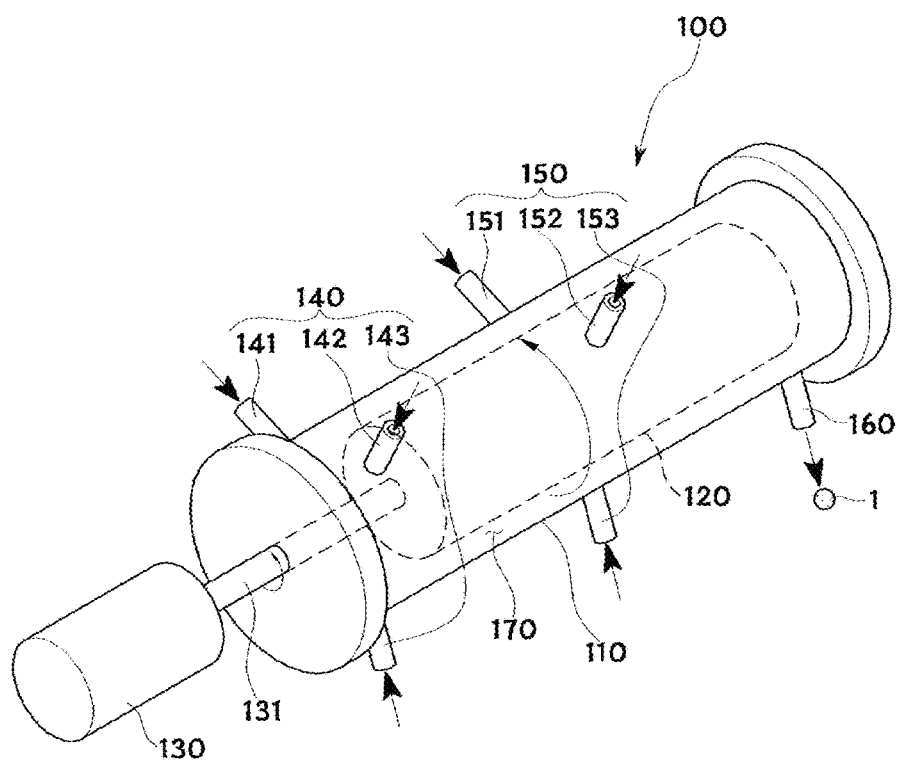
FIG. 1 is a schematic perspective view illustrating a structure of a continuous Couette-Taylor crystallizer used in preparing core-shell structured particles through a preparing method according to an embodiment of the present invention.

1: core-shell structured particle
10: core particle
20: shell layer
100: continuous Couette-Taylor crystallizer
110: outer fixed cylinder
120: inner rotation cylinder
130: motor
131: rotation axis
140: core reactant inlet
141, 151: metallic aqueous solution inlet
142, 152: basic aqueous solution inlet
143, 153: ammonia aqueous solution inlet
150: shell reactant inlet
160: product outlet
170: fluid passage
171: Couette-Taylor vortex

BEST MODE FOR CARRYING OUT THE INVENTION

Hereinafter, exemplary Embodiments of the present invention will be described in detail with reference to accompanying drawings. The following embodiments are disclosed for illustrative purposes only. Those ordinary skilled in the art may make many variations and improvements without departing from the spirit and scope of the present invention. Therefore, the present invention should not be construed as being limited to the embodiments.

A method for preparing a core-shell structured particle according to an embodiment of the present invention, the method uses a continuous Couette-Taylor crystallizer in which a core reactant inlet, a shell reactant inlet, and a product outlet are sequentially formed on an outer cylinder along a flow direction of a fluid flowing in a Couette-Taylor fluid passage between the outer cylinder and an inner cylinder, wherein a core particle is primarily formed in the fluid passage by a core reactant supplied through the core reactant inlet; a shell layer is formed on a surface of the core particle to cover the core particle by a shell reactant supplied through the shell reactant inlet; and then a core-shell structured particle in which a shell layer is formed on the surface of the core particle to cover the core particle, is discharged to the outside through the product outlet.

Figure 2A:
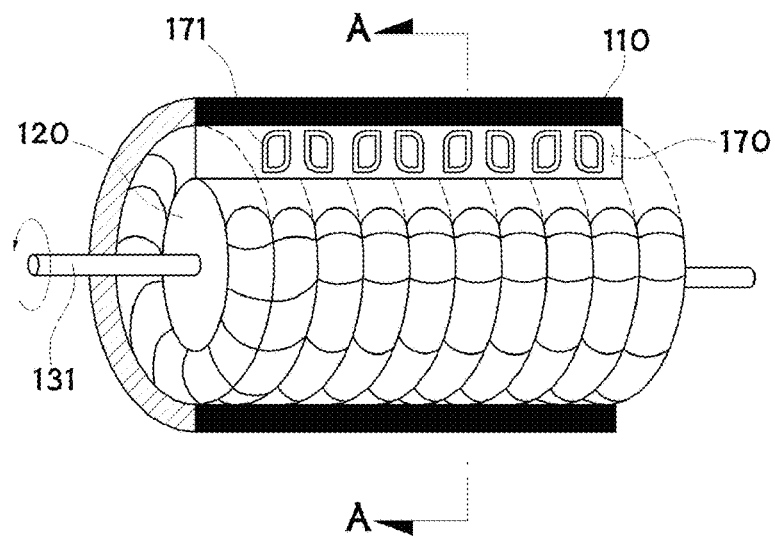
FIG. 2A is a schematic exploded perspective view illustrating structures of an outer fixed cylinder and an inner rotation cylinder in the continuous Couette-Taylor crystallizer of FIG. 1.
Figure 2B:
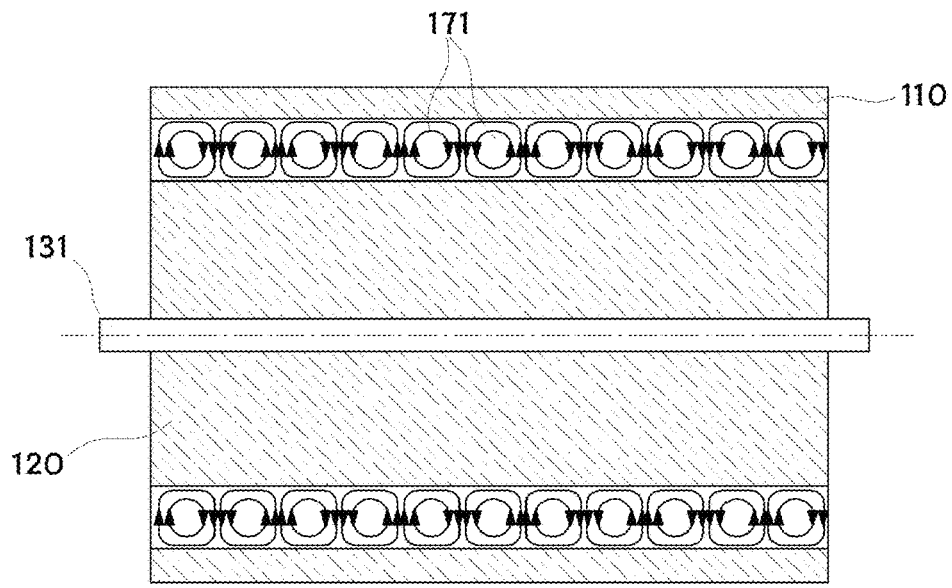
FIG. 2B is a cross-sectional view illustrating the outer fixed cylinder and the inner rotation cylinder.

FIG. 1 is a schematic perspective view illustrating a structure of a continuous Couette-Taylor crystallizer used in preparing core-shell structured particles through a preparing method according to an embodiment of the present invention, FIG. 2A is a schematic exploded perspective view illustrating structures of an outer fixed cylinder and an inner rotation cylinder in the continuous Couette-Taylor crystallizer of FIG. 1, and FIG. 2B is a cross-sectional view illustrating the outer fixed cylinder and the inner rotation cylinder. Hereinafter, a preparing method according to an embodiment of the present invention will be described with reference to FIGS. 1, 2A, and 2B.

As illustrated in FIGS. 1, 2A, and 2B, a Couette-Taylor crystallizer 100, which is usable in a preparing method according to an embodiment of the present invention, includes an outer fixed cylinder 110 and an inner rotation cylinder 120. The inner rotation cylinder 120 has a rotation axis in the same direction as a longitudinal axis of the outer fixed cylinder 110 to be installed inside the outer fixed cylinder 110 so as to be rotatable on the rotation axis 131 in a state of being spaced apart from the outer fixed cylinder 110. The rotation of the rotation axis 131 is performed through operation of a motor 130. While an outer cylinder may be rotated and an inner cylinder may be fixed, it is exemplarily described that the inner cylinder is rotated.

When the inner rotation cylinder 120 is rotated, a fluid, which is disposed toward the inner rotation cylinder 120 in a fluid passage 170 that is a gap between the outer fixed cylinder 110 and the inner rotation cylinder 120, tends to be moved toward the outer fixed cylinder 110 by centrifugal force, and thus the fluid becomes unstable to form a vortex having a pair of rings that are regularly rotated in opposite directions along the rotation axis 131. The vortex is referred to as a Taylor or Couette-Taylor vortex 171.

A core reactant inlet 140, a shell reactant inlet 150, and a product outlet 160 are sequentially formed on the outer fixed cylinder 110 along a flow direction of the fluid flowing in the fluid passage 170 so as to be communicated with the fluid passage 170.

Also, the core reactant inlet 140 includes a metallic aqueous solution inlet 141, a basic aqueous solution inlet 142, and an ammonia aqueous solution inlet 143. At this time, all of the metallic aqueous solution inlet 141, the basic aqueous solution inlet 142 and the ammonia aqueous solution inlet 143 may not be separately provided, and may be configured to be shared such that the number of these elements is reduced.

Also, the shell reactant inlet 150 includes a metallic aqueous solution inlet 151, a basic aqueous solution inlet 152, and an ammonia aqueous solution inlet 153, and the inlets 151, 152, and 153 may be separately provided, but may be provided to be shared like the above case.

When the metallic aqueous solution inlets 141 and 151 and the basic aqueous solution inlets 142 and 152 are separately provided, it is preferable that the metallic aqueous solution inlets 141 and 151 and the basic aqueous solution inlets 142 and 152 face each other in consideration of a reaction between a metallic aqueous solution and a base aqueous solution. The term "face" used herein includes not only "the inlets face each other", but also "the inlets are on the same starting line".

Accordingly, a method for preparing a core-shell structured particle according to an embodiment of the present invention by using a continuous Couette-Taylor crystallizer 100 having the structure described above, may be performed as described below.

A core reactant is supplied through the core reactant inlet 140, and a shell reactant is supplied through the shell reactant inlet 150. Hence, a core particle 10 is primarily formed in the fluid passage 170 by the core reactant supplied through the core reaction inlet 140, a shell layer 20 is secondly formed on a surface of the core particle 10 to cover the core particle in the fluid passage 170 by the shell reactant supplied through the shell reactant inlet 150, so that a core-shell structured particle 1 in which the shell layer 20 is formed on the surface of the core particle 10 to cover the core particle, is discharged to the outside through the product outlet 160.

At this time, the core reactant includes a metallic aqueous solution, a base aqueous solution, and an ammonia ($NH_4OH$) aqueous solution.

In detail, the metallic aqueous solution may be a solution in which a metallic salt including at least one selected form the group consisting of cobalt (Co), manganese (Mn), nickel (Ni), aluminum (Al), cobalt (Co), manganese (Mn), aluminum (Al), magnesium (Mg), copper (Cu), zinc (Zn), iron (Fe), vanadium (V), chromium (Cr), titanium (Ti), tungsten (W), and molybdenum (Mo), is dissolved in water.

In more detail, the metallic salt may be a metal sulfate including at least one metal descried above, and in further more detail, may be $NiSO_4 \cdot 6H_2O$, $CoSO_4 \cdot 7H_2O$, $MnSO_4 \cdot H_2O$ or the like.

Also, a sodium hydroxide (NaOH) or potassium hydroxide aqueous solution may be used as the base aqueous solution.

At this time, the composition of the metallic aqueous solution supplied through the core reactant inlet 140 may be different from that of the metallic aqueous solution supplied through the shell reactant inlet 150.

In detail, the metallic aqueous solutions may be adjusted to proper amounts, mixed and supplied such that in the core-shell structured particle finally prepared, the core particle 10 include a compound of Chemical Formula 1 below, and the shell layer 20 includes a compound of Chemical Formula 2.

$[Ni_xCo_yMn_z](OH)_2$     [Chemical Formula 1]

(In the Chemical Formula 1, $0<x<1$, $0<y<1$, $0<z<1$, $x+y+z=1$, and $x>y+z$)

$[Ni_aCo_bMn_c](OH)_2$     [Chemical Formula 2]

(In the Chemical Formula 2, $0<a<1$, $0<b<1$, $0<c<1$, $a+b+c=1$, and $a=c$)

In an example, when the shell layer 20 in the core-shell structured particle finally prepared includes a compound of $[NiO_{.475}Co_{0.05}Mn_{0.475}](OH)_2$, a Ni-containing metallic salt, a Co-containing metallic salt, and an Mn-containing metallic salt may be mixed to be supplied such that a ratio of Ni, Co, and Mn is 0.475:0.05:0.475 as the shell reactant supplied through the metallic aqueous solution inlet 151 of the shell reactant inlet 150.

The metallic aqueous solution and the basic aqueous solution may be supplied at the same flow rate, and the ammonia aqueous solution may be supplied in an amount of $\frac{1}{10}$ of the shell reactant. At this time, it may be preferable that a nitrogen gas be continuously supplied to the reactant solution in order to prevent oxidation of the reactant.

The core-shell structured particle 1, which is prepared through a preparing method according to the present invention, is a hybrid particle in which high electrical capacity of a nickel-rich core particle 10 and high electrical stability of the shell layer 20 are combined to each other, and may be expected as an ideal electrode material having high cycling stability and high electrical capacity. Therefore, the uniformity in thickness of the shell layer 20 may be considered as an important factor that determines an electrochemical characteristic of the core-shell structured particle 1. The uniformity in thickness of the shell layer 20 is influenced by a concentration of the shell reactant, a rotational speed of the inner rotation cylinder 120, an average residence time of the shell reactant, a pH of the shell reactant and the like during the preparing process.

Accordingly, in a method for preparing a core-shell structured particle according to an embodiment of the present invention, the concentration of the shell reactant may be 1.0 M or less.

When the concentration of the shell reactant is excessively high over 1 M, a shell solid is rapidly nucleated, rather than the shell layer 20 is not formed on the core particle 10, so that a homo-agglomeration in which the shell layer 20 is self-agglomerated, may occur. When the homo-agglomeration occurs, it is difficult to form a shell layer 20 having a uniform thickness.

In a method for preparing a core-shell structured particle according to an embodiment of the present invention, the rotational speed of the inner rotation cylinder 120 may be specifically in a range of 100 rpm to 3,000 rpm.

When the inner rotation cylinder 120 is very slowly rotated, fluid strength of the Couette-Taylor vortex 171 is not sufficient, so that a uniform stack is not induced, but rather the homo-agglomeration of the shell solid is induced. Also, when the rotation speed of the inner rotation cylinder 120 is slower than 100 rpm, the shell layer 20 is not properly formed, and when the inner rotation cylinder 120 is rotated at a rotational speed of 3,000 rpm or more, the shell layer 20 strongly tends to be sheared out by shear strength of the Couette-Taylor vortex 171, and accordingly, since an increase in thickness of the shell layer 20 is negligible, effectiveness may be reduced.

Also, in a method for preparing a core-shell structured particle according to an embodiment of the present invention, the average residence time in which the shell reactant remains in the fluid passage 170 until the shell reactant supplied through the shell reactant inlet 150 is discharged to the outside through the product outlet 160, may be in a range of 30 minutes to 90 minutes. When the average residence time deviates from the foregoing average residence time range and is excessively short, the shell layer 20 is not formed on the core particle 10, but is self-agglomerated, so that it is difficult to form a shell layer having a uniform thickness, and when the average residence time exceeds 90 minutes, a variation of tap-density according to an increase in the average residence time, is negligible.

Further, in a method for preparing a core-shell structured particle according to an embodiment of the present invention, the pH of the shell reactant may be specifically in a range of 11 to 13. When the pH deviates from the above range, it is difficult to form the shell layer 20 having a uniform thickness due to the homo-agglomeration of a shell solid.

Figure 3:
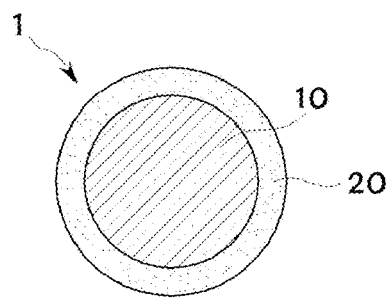
FIG. 3 is a schematic cross-sectional view illustrating a structure of a core-shell structured particle prepared by a method according to an embodiment of the present invention.

FIG. 3 is a schematic cross-sectional view illustrating a structure of a core-shell structured particle prepared by a preparing method to an embodiment of the present invention.

As illustrated in FIG. 3, the core-shell structured particle 1, which is prepared by the preparing method according to an embodiment of the present invention, has a structure in which the shell layer 20 is formed on a surface of the core particle 10 to cover the core particle.

In detail, in the core-shell structured particle, the core particle 10 may include a Ni-rich compound of Chemical Formula 1 below, which is excellent in electrical capacity, and the shell layer 20 may include a compound of Chemical Formula 2, which includes nickel and manganese in the same amount and shows excellent durability.

$[Ni_xCo_yMn_z](OH)_2$     [Chemical Formula 1]

(In the Chemical Formula 1, $0<x<1$, $0<y<1$, $0<z<1$, $x+y+z=1$, and $x>y+z$)

$[Ni_aCo_bMn_c](OH)_2$     [Chemical Formula 2]

(In the Chemical Formula 2, $0<a<1$, $0<b<1$, $0<c<1$, $a+b+c=1$, and $a=c$)

In more detail, the core particle may include a compound of $[Ni_{0.9}Co_{0.05}Mn_{0.05}](OH)_2$, and the shell layer 20 may include a compound of $[Ni_{0.475}Co_{0.05}Mn_{0.475}](OH)_2$.

Since the core particle 10 is excellent in electrical capacity, and the shell layer 20 is excellent in durability, the core-shell structured particle 1 prepared though the preparing method has excellent electrical capacity and excellent durability at the same time. Therefore, the core-shell structured particle 1 is useful for a positive electrode active material of a lithium secondary material.

MODE FOR CARRYING OUT THE INVENTION

Hereinafter, the present invention will be described in more detail though Examples. However, the following Examples are illustrative of the invention and are not to be construed as limiting thereof.

EXAMPLE

As in FIGS. 1, 2A, and 2B, a core-shell structured particle was prepared by using a continuous Couette-Taylor crystallizer in which a core reactant inlet, a shell reactant inlet, and a product outlet are sequentially formed on an outer cylinder along a flow direction of a fluid flowing in a Couette-Taylor fluid passage between the outer cylinder and an inner cylinder.

In detail, a mixture of metal sulfates of $NiSO_4.6H_2O$, $CoSO_4.7H_2O$, and $MnSO_4.H_2O$ was supplied through metallic aqueous solution inlets 141 and 151, a sodium hydroxide (NaOH) aqueous solution was supplied through basic aqueous solution inlets 142 and 152, and an ammonium hydrate ($NH_4OH$) solution was supplied through ammonia aqueous solution inlets 143 and 153. At this time, the metal sulfates such as $NiSO_4.6H_2O$, $CoSO_4.7H_2O$, and $MnSO_4.H_2O$ were mixed such that a ratio of Ni, Co, and Mn is 0.9:0.05:0.05, and then were supplied though the metallic aqueous solution inlet 111 of the core reactant inlet 140, and the metal sulfates such as $NiSO_4.6H_2O$, $CoSO_4.7H_2O$, and $MnSO_4.H_2O$ were mixed such that a ratio of Ni, Co, and Mn is 0.475:0.05:0.475, and then were supplied though the metallic aqueous solution inlet 151 of the shell reactant inlet 150. Also, the metallic aqueous solution and the basic aqueous solution were supplied at the same flow rate, and the ammonia aqueous solution may be supplied in an amount of 1/10 of the shell reactant. Also, a nitrogen gas was continuously blown into the reactant solution in order to prevent oxidation of the reactants. Also, a concentration of the shell reactant was set to be 0.9 M; a rotational speed of the inner cylinder 120 was set to be 1,000 rpm; an average residence time in which the shell reactant remains in the fluid passage 170 until the shell reactant supplied through the shell reactant inlet 150 is discharged to the outside through the product outlet 160 was set to be 60 minutes; and a pH of the shell reactant was set to be in a range of 11 to 13. As a result, a core-shell structured particle in which the core particle includes a compound of $[Ni_{0.9}Co_{0.05}Mn_{0.05}](OH)_2$, and the shell layer includes a compound of $[Ni_{0.475}Co_{0.05}Mn_{0.475}](OH)_2$, was prepared.

Figure 4:
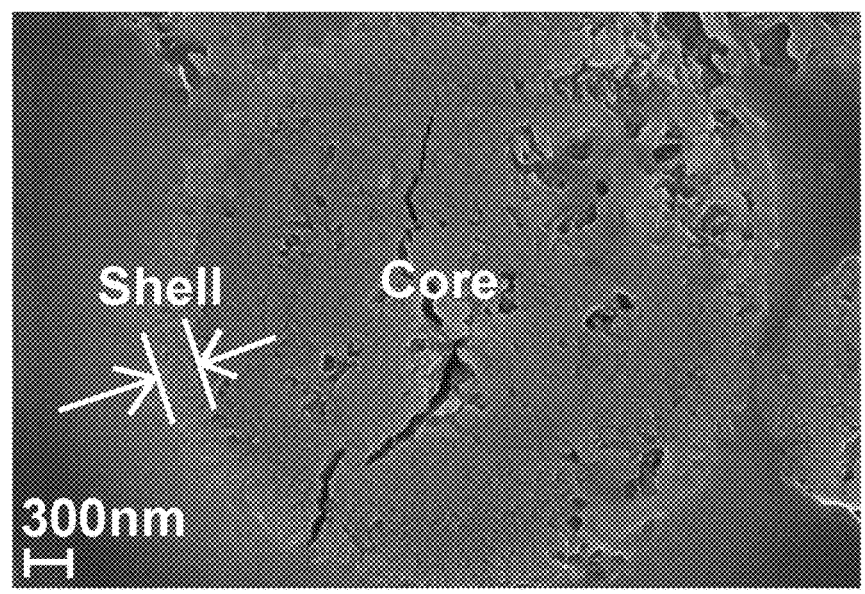
FIG. 4 is an electron microscope image of a core-shell structured particle prepared by a preparing method according to an embodiment of the present invention.

The prepared core-shell structured particle was observed through an electron microscope, and the observed result is shown in FIG. 4 (measurement conditions of the electron microscope: EHT=10.00 kV, Signal A=InLens, contrast=27.0%, Mag=50.00 KX, and WD=5.1 mm).

Also, the core-shell structured particle was analyzed by using an energy-dispersive X-ray spectroscopy (EDX). The analyzed results are shown in the following Tables 1 and 2.

The following Tables 1 and 2 show the analyzed results with respect to a core and a shell in the core-shell structured particle.

TABLE 1

| Component | Weight % | Atom % |
| --- | --- | --- |
| Ni | 90.44 | 90.77 |
| Mn | 4.91 | 4.46 |
| Co | 4.65 | 4.57 |

TABLE 2

| Component | Weight % | Atom % |
| --- | --- | --- |
| Ni | 48.34 | 47.97 |
| Mn | 45.07 | 46.56 |
| Co | 6.59 | 5.47 |

From the analyzed results, it can be seen that the core particle 10 has an Ni-rich composition of about 90.4 weight % of Ni, about 4.9 weight % of Mn, and about 4.7 weight % of Co, and the shell layer 20 has a composition of about 48.3 weight % of Ni, about 45.1 weight % of Mn, and about 6.6 weight % of Co in which Ni and Mn are added in nearly the same amount (where an error range is ±7%).

INDUSTRIAL AVAILABILITY

As described in detail, according to a preparing method for the present invention, a core particle and a shell layer are continuously formed in one Couette-Taylor crystallizer, thereby simply and massively producing a core-shell particle. Also, since a fluid passage of the Couette-Taylor crystallizer is narrow and has an active fluid, it is possible to form a particle having a uniform size. Furthermore, since the formation of a shell layer is sensitively influenced by a concentration of a shell reactant, a rotational speed of an inner rotation cylinder, an average residence time of the shell reactant, and a pH of the shell reactant, it is possible to simply and massively obtain a core-shell structured particle that is excellent in electrical capacity and durability though the appropriate process conditions described above.

The invention claimed is:

1. A method for preparing a core-shell structured particle, the method using a continuous Couette-Taylor crystallizer in which a core reactant inlet, a shell reactant inlet, and a product outlet are sequentially formed on an outer cylinder along a flow direction of a fluid flowing in a Couette-Taylor fluid passage between the outer cylinder and an inner cylinder, wherein a core particle is primarily formed in the fluid passage by a core reactant supplied through the core reactant inlet; a shell layer is formed on a surface of the core particle to cover the core particle by a shell reactant supplied through the shell reactant inlet; and a core-shell structured particle in which the shell layer is formed on the surface of the core particle to cover the core particle, is discharged to the outside through the product outlet, wherein each of the core reactant and the shell reactant independently comprises a metallic aqueous solution, a base aqueous solution, and an ammonia aqueous solution, when at least one of the core reactant or the shell reactant is supplied, gas consisting of nitrogen is continuously supplied to a reactant solution in order to prevent oxidation of the core reactant or the shell reactant, and wherein a composition of the metallic aqueous solution of the core reactant is different from that of the metallic aqueous solution of the shell reactant, and wherein a concentration of the shell reactant is 1.0 M or less and wherein a core-shell structured particle consists of a single core particle covered by a shell layer.

2. The method for claim 1, wherein the core particle comprises a compound of the following Chemical Formula 1, and the shell layer comprises a compound of the following Chemical Formula 2

   [Chemical Formula 1]

(In the Chemical Formula 1, $0<x<1$, $0<y<1$, $0<z<1$, $x+y+z=1$, and $x>y+z$)

   [Chemical Formula 2]

(In the chemical Formula 2, $0<a<1$, $0<b<1$, $0<c<1$, $a+b+c=1$, and $a=c$).

3. The method of claim 2, wherein the core particle comprises $Ni_{0.9}Co_{0.05}Mn_{0.05}(OH_2)$ and the shell layer comprises $Ni_{0.475}Co_{0.05}Mn_{0.475}(OH)_2$.

4. The method for claim 1, wherein a rotational speed of the inner cylinder is in a range of 100 rpm to 3,000 rpm.

5. The method for claim 1, wherein an average residence time in which the shell reactant remains in the fluid passage until the shell reactant supplied through the shell reactant inlet is discharged to the outside through the product outlet, is in a range of 30 minutes to 90 minutes.

6. The method for claim 1, wherein a pH of the shell reactant is in a range of 11 to 13.

7. The method for claim 1, wherein a concentration of the shell reactant is 1.0 M or less; a rotational speed of the inner cylinder is in a range of 100 rpm to 3,000 rpm; an average residence time in which the shell reactant remains in the fluid passage until the shell reactant supplied through the shell reactant inlet is discharged to the outside through the product outlet, is in a range of 30 minutes to 90 minutes; a pH of the shell reactant is in a range of 11 to 13.

8. The method of claim 1, wherein the ammonia solution is supplied in an amount of $1/10^{th}$ of the shell reactant.

9. The method of claim 1, wherein the core-shell structured particle comprises a nickel-rich core particle.

* * * * *